United States Patent
Umeno et al.

(10) Patent No.: US 7,472,147 B2
(45) Date of Patent: Dec. 30, 2008

(54) RANDOM NUMBER STRING OUTPUT APPARATUS, RANDOM NUMBER STRING OUTPUT METHOD, PROGRAM, AND INFORMATION RECORDING MEDIUM

(75) Inventors: Ken Umeno, 10-307, Nanpeidai 8-chome, Shibuya-ku, Tokyo 150-0036 (JP); Shenghung Shih, Tokyo (JP)

(73) Assignees: Japan Science and Technology Agency, Saitama (JP); Ken Umeno, Tokyo (JP)

( * ) Notice: Subject to any disclaimer, the term of this patent is extended or adjusted under 35 U.S.C. 154(b) by 756 days.

(21) Appl. No.: 10/494,792

(22) PCT Filed: Nov. 5, 2002

(86) PCT No.: PCT/JP02/11526

§ 371 (c)(1),
(2), (4) Date: Oct. 12, 2004

(87) PCT Pub. No.: WO03/040910

PCT Pub. Date: May 15, 2003

(65) Prior Publication Data

US 2005/0033785 A1 Feb. 10, 2005

(30) Foreign Application Priority Data

Nov. 5, 2001 (JP) ............................. 2001-339429

(51) Int. Cl.
*G06F 1/02* (2006.01)
(52) U.S. Cl. ................................................... 708/250
(58) Field of Classification Search ................... 708/250
See application file for complete search history.

(56) References Cited

U.S. PATENT DOCUMENTS

| 5,420,928 | A | * | 5/1995 | Aiello et al. ................... 380/46 |
| 5,727,063 | A | * | 3/1998 | Aiello et al. ................... 380/46 |
| 7,233,965 | B2 | * | 6/2007 | Rarick .......................... 708/250 |
| 2003/0014451 | A1 | * | 1/2003 | Peyser et al. ................. 708/250 |

FOREIGN PATENT DOCUMENTS

| GB | 2333652 A | 7/1999 |
| JP | S59-47834 | 3/1984 |
| JP | H02-82810 | 3/1990 |
| JP | H03-33917 | 2/1991 |
| JP | 2000-276331 | 10/2000 |

(Continued)

*Primary Examiner*—Tan V Mai
(74) *Attorney, Agent, or Firm*—Mitchell P. Brook; Luce, Forward, Hamilton & Scripps

(57) ABSTRACT

A random number sequence output apparatus (101) includes a sequence acceptance unit (102) for accepting input of a numerical sequence, an initial value setting unit (103) for accepting an initial value and causing a storage unit (104) to store this, an output unit (105) for outputting a new value stored in the storage unit (104), a calculation unit (106) for applying a predetermined rational map stored in he storage unit (104) each time the output unit (105) outputs a value and further applying a predetermined calculation unit to the value and value extracted from the numerical sequence accepted by the sequence acceptance unit (102), and an updating unit (104) to store the value of the result of calculation performed by the calculation unit (106), thereby performing updating.

16 Claims, 11 Drawing Sheets

FOREIGN PATENT DOCUMENTS

| | | |
|---|---|---|
| JP | 2001-60937 | 3/2001 |
| JP | 2001-060937 | 3/2001 |
| JP | 2001-175168 | 6/2001 |
| JP | 2001-292129 | 10/2001 |
| JP | 2002-304289 | 10/2002 |
| JP | 2002-305451 | 10/2002 |
| JP | 2002-312161 | 10/2002 |

* cited by examiner $$\sum_{n=0}^{N-1} (1/2)^{n+1} b_n \quad \text{FIXED-POINT NOTATION}$$

$$\sum_{n=0}^{N-1} 2^{N-1-n} b_n \quad \text{INTEGRAL NOTATION}$$

RANDOM NUMBER STRING OUTPUT APPARATUS, RANDOM NUMBER STRING OUTPUT METHOD, PROGRAM, AND INFORMATION RECORDING MEDIUM

TECHNICAL FIELD

The present invention relates to a random number sequence output apparatus, a random number sequence output method, a program for realizing the random number sequence output apparatus and the random number sequence output method, and a computer readable information recording medium that stores the program.

BACKGROUND ART

Conventionally, an art of generating a random number sequence by a chaos map applying a Chebyshev polynomial is known. This art of generating sets a sequence $x_0, x_1, x_2, \ldots$, that is obtained by providing an initial value $x_0$ ($-1 < x_0 < 1$) towards a recurrence formula $$x_{i+1} = T(a, x_i)(i \geq 0)$$

applying a Chebyshev map $T(a, x_1)$ of an $a^{th}$ ($a \geq 2$) degree defined by $$T(a, \cos\theta) = \cos(a\theta)$$

towards an integer a. Other than the Chebyshev map, methods applying various rational functions are proposed.

According to this art, it is known that by performing calculation of the recurrence formula by a rational number, a pseudorandom number sequence without a cycle can be obtained, and the distribution of the generated random numbers can be analytically expressed.

However, even in a case of calculating a recurrence formula by a rational expression of an infinite precision, it is preferable that a generating method for various random numbers is realized.

In a case where the calculation of the recurrence formula is performed by a fixed-point notation of a predetermined precision or by a floating-point notation, a problem that, a cycle appears in the sequence that is obtained, and that there is a case that the cycle is short.

Further, there is a problem that the distribution of the generated sequence differs from the distribution of the above that can be analytically expressed, in that the obtained distribution becomes a singular one because of the short periodicity.

The present invention is a method for avoiding these kinds of problems, and the purpose of the present invention is to provide a random number sequence output apparatus, a random number sequence output method, a program for realizing the two, and a computer readable information recording medium that stores the program.

DISCLOSURE OF INVENTION

To achieve the object of the above, according to the basis of the present invention, the invention of below will be disclosed.

A random number sequence output apparatus according to a first aspect of the present invention, comprises a sequence acceptance unit, an initial value setting unit, a storage unit, an output unit, a calculation unit, and an updating unit, and is structured as below.

Namely, the sequence acceptance unit accepts input of a numeral sequence.

The initial value setting unit accepts input of an initial value, and the initial value is stored to the storage unit.

The output unit outputs the value each time a new value is stored to the storage unit.

The calculation unit applies a predetermined rational map to the value stored in the storage unit, and further calculates, by carrying out a predetermined operation to the value of above and a value sequentially extracted from the numerical sequence accepted by the sequence acceptance unit.

The updating unit updates by storing the results of the value calculated by the calculation unit to the storage unit.

In the random number sequence output apparatus according to the present invention, the predetermined rational map may be structured to be a Chebyshev map of equal to or higher than a second degree.

In the random number sequence output apparatus according to the present invention, the storage unit may be structured to store the value at a fixed-point notation of a predetermined number of bits.

In the random number sequence output apparatus according to the present invention, the predetermined operation may be structured to invert the bits of a predetermined position of a fixed-point notation of the predetermined number of bits of the value, in a case where a value sequentially extracted from the numerical sequence is a predetermined value.

In the random number sequence output apparatus according to the present invention, the numerical sequence may be structured so that the sequence that has a length T repeats a binary sequence (including a gold code, an M sequence, and a Baker sequence, etc.), taking a value of 0 or 1, and that the bit of the predetermined position may be a least significant bit of the fixed-point notation, and the predetermined value may be 1.

A random number sequence output method according to another aspect of the present invention comprises a sequence acceptance step, an initial value setting step, an output step, a calculation step, and an updating step, and is structured as below.

Namely, the sequence acceptance step accepts input of a numerical sequence.

The initial value setting step accepts input of an initial value, and stores the value in the storage unit.

The output step outputs the value each time a new value is stored in the storage unit.

The calculation step applies a predetermined rational map to the value stored in the storage unit, and further calculates, by carrying out a predetermined operation to the value of above and a value sequentially extracted from the numerical sequence accepted in the sequence acceptance step.

The updating step updates by storing the results of the value calculated in the calculation step, to the storage unit.

In the random number sequence output method according to the present invention, the predetermined rational map may be structured to be a Chebyshev map of equal to or higher than a second degree.

In the random number sequence output method according to the present invention, it may be structured so that the value is stored in a fixed-point notation of a predetermined bit to the storage unit, in the initial value setting step and the updating step.

In the random number sequence output method according to the present invention, the predetermined operation may be structured to invert the bits of a redetermined position of a fixed-point notation of the predetermined number of bits of the value, in a case where a value sequentially extracted from the numerical sequence is a predetermined value.

In the random number sequence output method according to the present invention, the numerical sequence may be structured so that a sequence that has a length T repeats a binary sequence (including a gold code, an M sequence, and a Baker sequence, etc.), taking a value of 0 or 1, and that the bit of the predetermined position is a least significant bit of the fixed-point notation, and the predetermined value is 1.

A program according to another aspect of the present invention is structured to control a computer (including an ASIC (Application Specific Integrated Circuit), a DSP (Digital Signal Processor), or an FPGA (Field Programmable Gate Array), etc.,) to function as the above random number sequence output apparatus, or to control the computer to execute the above random number sequence output method.

The program of the present invention may be stored to a computer readable information recording medium (including a compact disk, a flexible disk, a hard disk, a magnetic optical disk, a digital video disk, a magnetic tape, and a semiconductor memory).

The above random number sequence output apparatus and the random number output method may be realized by executing the program of the present invention by a general computer, a portable telephone, a PHS (Personal Handyphone System) device, a portable terminal such as a game device, etc., an information processing device, such as a parallel computer, etc., an ASIC, a DSP, or an FPGA, etc., that comprises a storage device, a calculating device, an output device, and a communication device, etc.

Independent from these devices, the information recording medium of the resent invention can be distributed or sold in stores, etc., or the program of the resent invention may be distributed and sold via a computer communication network.

BEST MODE FOR CARRYING OUT THE INVENTION (EMBODIMENT OF THE INVENTION)

An embodiment of the present invention will be described below. The embodiments described below are illustrated and do not restrict the scope of the invention. It is therefore possible for those skilled in the art to employ embodiments in which those individual elements or all the elements are replaced with their equivalent elements, but those embodiments are also included in the scope of the invention.

Figure 1:
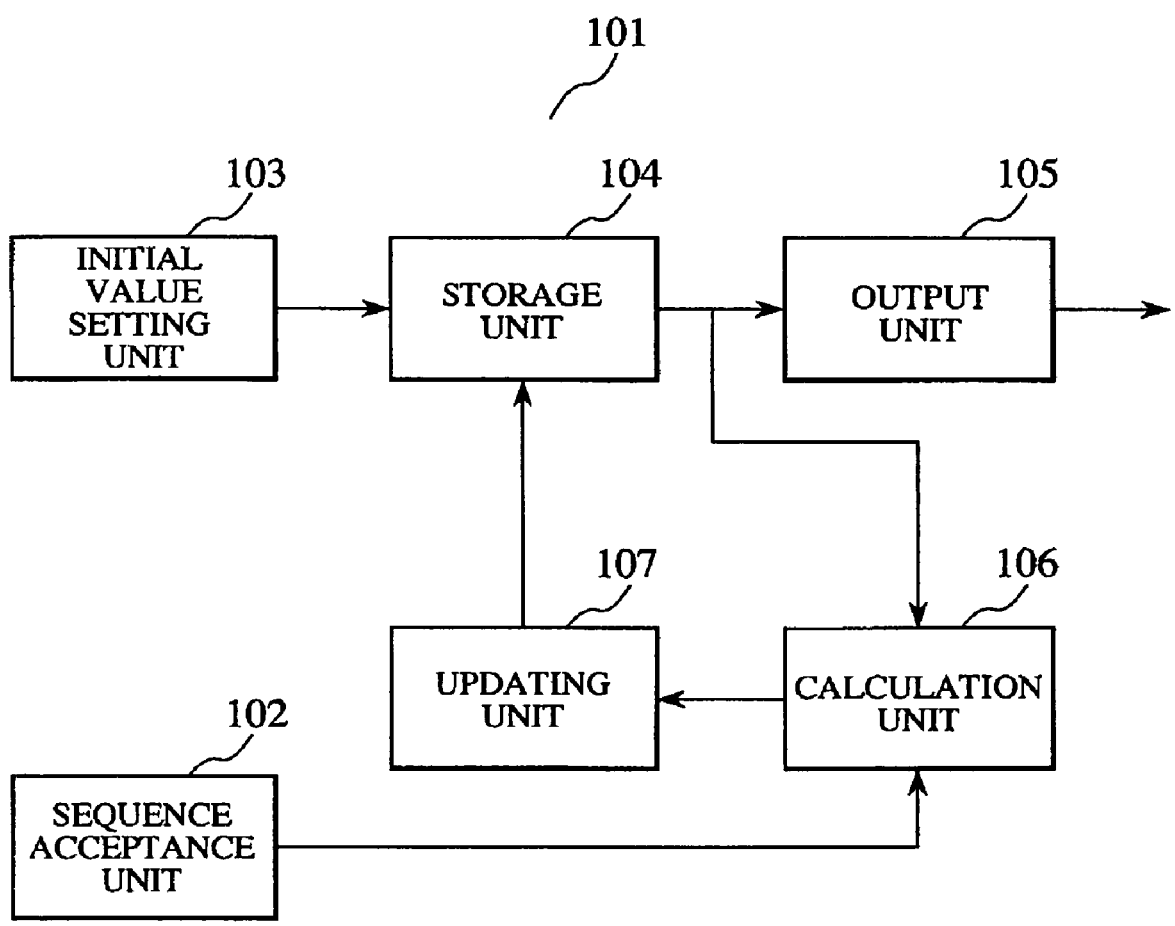
FIG. 1 is a diagram showing an outline structure of a random number sequence generating apparatus according to an embodiment of the present invention.
Figure 2:
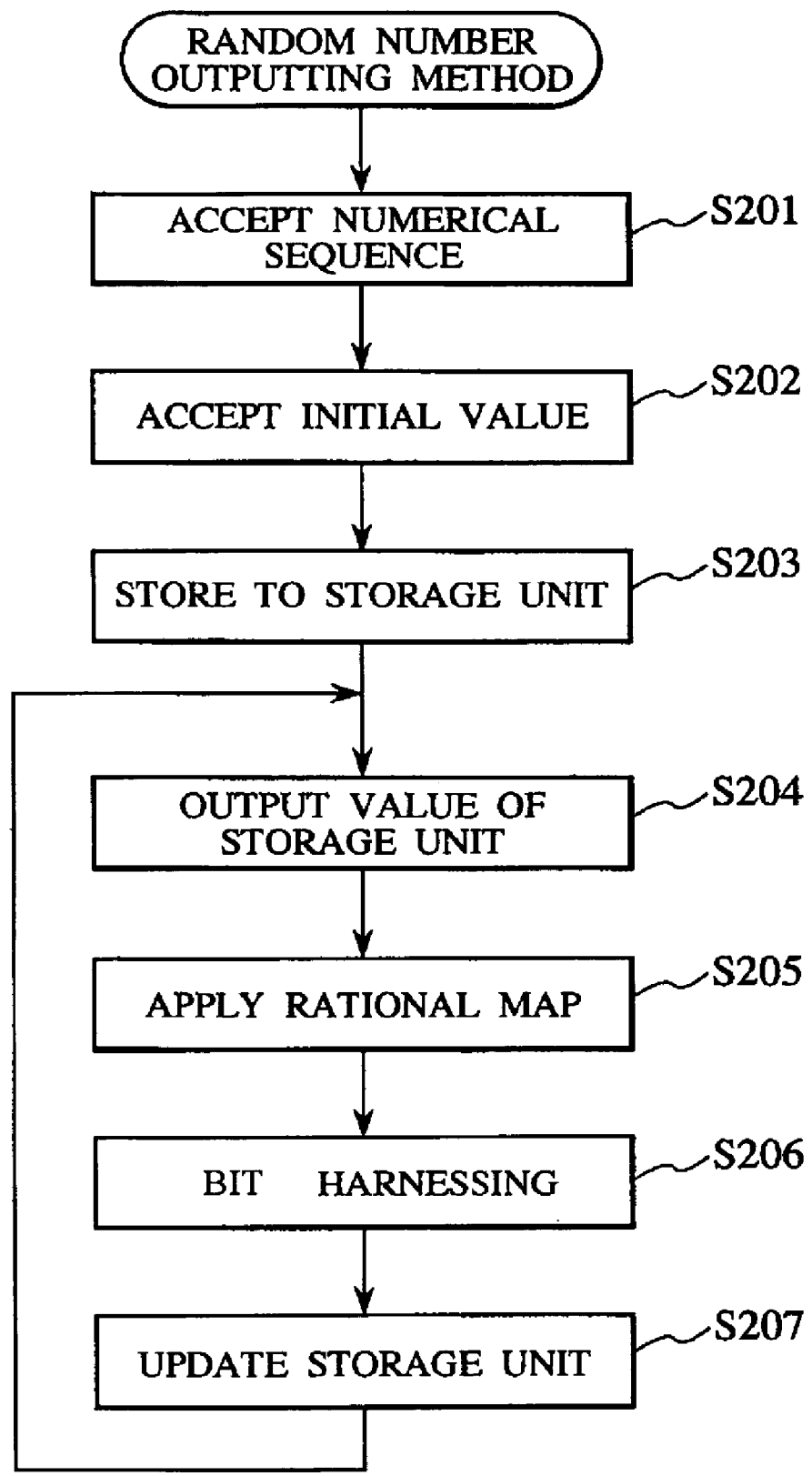
FIG. 2 is a flowchart showing a random number sequence generating method executed in the random number sequence generating apparatus.

FIG. 1 is a diagram showing a schematic structure of a random number sequence generating apparatus according to an embodiment of the present invention. FIG. 2 is a flowchart showing processing of a random number sequence generating method executed in the random string generating apparatus. Below, descriptions will be made with reference to these drawings.

A random number sequence output apparatus 101 comprises a sequence acceptance unit 102, an initial value setting unit 103, a storage unit 104, an output unit 105, a calculation unit 106, and an updating unit 107.

First, the sequence acceptance unit 102 accepts input of a numerical sequence (step S201). The numerical sequence is typically a repetition of a binary sequence, such as a gold code, an M sequence, and a Baker sequence, etc. The gold code and the M sequence is a pseudorandom number sequence of a value of 0 or 1 of a cycle $T=2^n-1$.

The sequence acceptance unit 102 accepts a numerical sequence of a length T as an integer value, stores the integer value, and as will be later described, may cyclic shift (also called "rotate" and "shift rotate") the integer value, after using the integer value to sequentially obtain the least significant bit of the integral value.

The initial value setting unit 103 accepts input of an initial value (step S202), and the initial value is stored to the storage unit 104 (step S203).

The storage unit 104 typically stores values at a fixed-point notation of a predetermined bit number.

Figure 3:
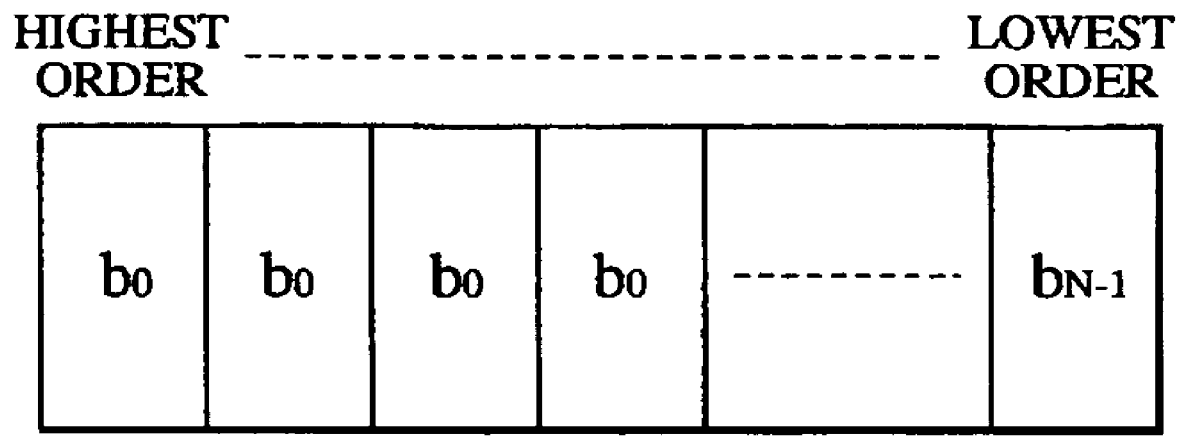
FIG. 3 is an explanatory diagram showing a situation of a case where a fixed point notation of N bits is adopted

FIG. 3 shows a situation where a fixed-point notation of N bits is adopted. FIG. 3 illustrates a case of fixed-points of 0 to 1. Placing the order from the highest-order bit to the least significant bit in an order of $b_0, b_1, b_2, \ldots, b_{N-1}$, each of them takes a value of 1 or 0.

This fixed-value notation:

$$\Sigma_{n=0}^{N-1}(\tfrac{1}{2})^{n+1}b_n.$$

corresponds to a value of equal to or higher than 0 and less than 1.

In most calculators, when looking at this fixed-value notation as an unsigned integer, the fixed-value notation corresponds to an integer value of:

$$\Sigma_{n=0}^{N-1}2^{N-1-n}b_n$$

Other than this, in a case of a fixed-point number of −1 to 1, any one of $b_0$ to $b_{N-1}$ (typically $b_0$) is set as a code bit, and the fixed-point notation is expressed by the left others. For example, in a case where $b_0$ is set as the code bit, the fixed-point notation by $b_0$ to $b_{N-1}$ corresponds to:

$$\Sigma_{n=1}^{N-1}(\tfrac{1}{2})^n b_n \text{ in the case of } b_0=0, \text{ and}$$

corresponds to:

$$-\Sigma_{n=1}^{N-1}(\tfrac{1}{2})^n b_n \text{ in the case of } b_0=1.$$

Further, the output unit 105 outputs this, each time a new value is stored to the storage unit 104 (step S204).

Then, each time the output unit 105 outputs a value, the calculation unit 106 applies a predetermined rational map to the value stored in the storage unit 104 (step S205), and further calculates, by carrying out a predetermined operation (hereinafter referred to as "harnessing") to the value of above and a value sequentially extracted from the numerical sequence accepted by the sequence acceptance unit 102 (step S206).

Figure 4:
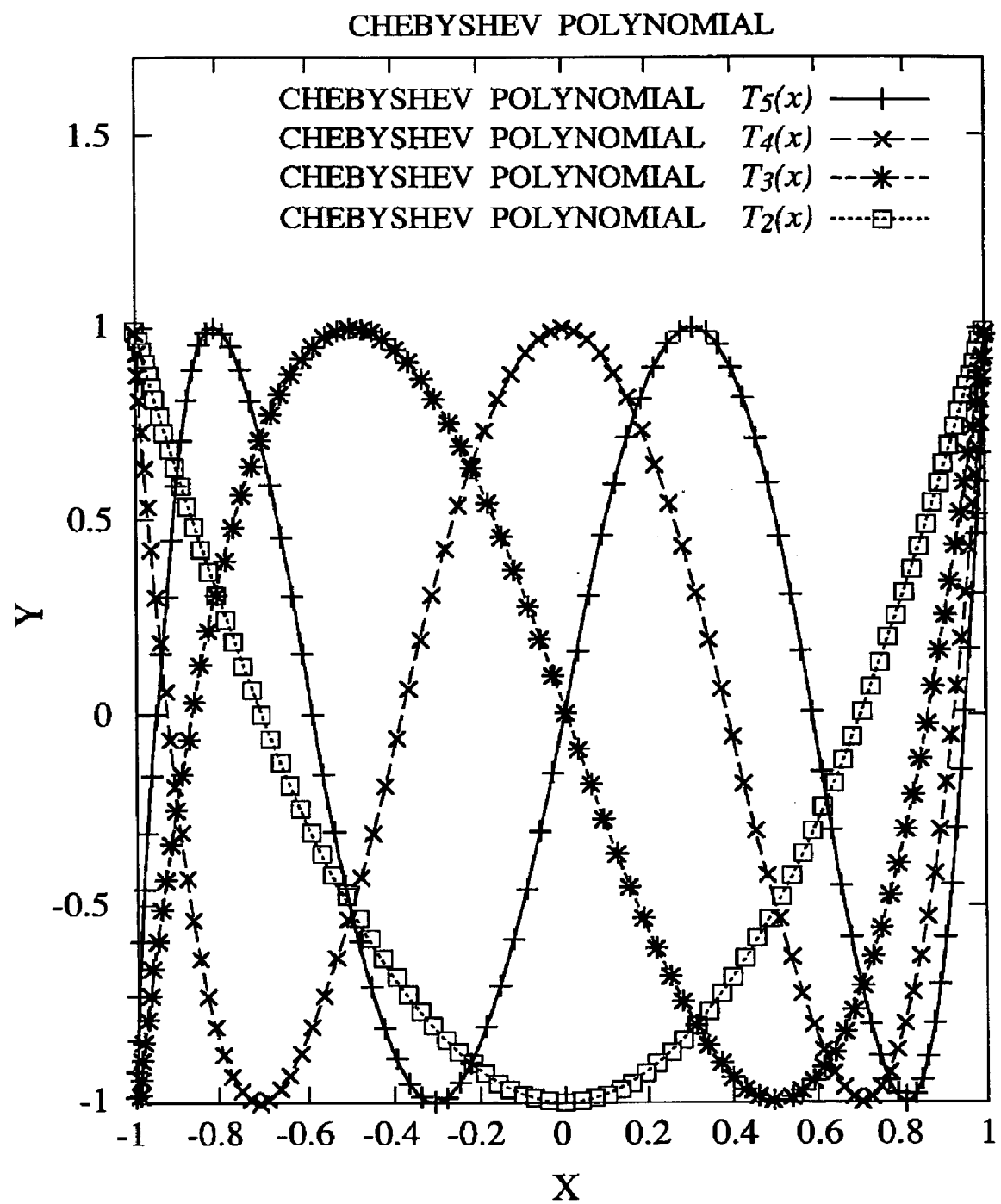
FIG. 4 is diagram showing a situation of a Chebyshev map.

Typically, the predetermined rational map is a Chebyshev map of a degree equal to or higher than a second degree. FIG. 4 is a graph showing a situation of a Chebyshev map. The Chebyshev map can be expressed as below, by polynomials:

$T(0, x)=1$ $T(1, x)=x$ $T(2, x)=2x^2-1$ $T(3, x)=4x^3-3x$

Each polynomial of the Chebyshev polynomial $y=T(a, x)$ is a rational map that maps an open interval of $-1<x<1$ to an open interval of $-1<y<1$.

In FIG. 4, a Chebyshev polynomial of a second to fifth degree is shown in a graph in the form of $y=T(2, x)$, $y=T(3, x)$, $y=T(4,x)$, and $y=T(5, x)$. The horizontal axis is the x axis, and the vertical axis is the y axis.

Moreover, typically, in a case where the value sequentially extracted from the numerical sequence is a predetermined value, a bit harnessing operation inverts the bits of a predetermined position of a fixed-point notation of the predetermined number of bits of the value. Namely, in a case where the predetermined value is 1, a bit harnessing operation inverts the value of the least significant bit $b_{N-1}$.

As described above, from the numeral sequence with an origin of an M-sequential, etc., a value of 0 or 1 can be obtained. However, looking at this "value of 0 or 1" and the fixed-point notation stored in the storage unit 106 as an "unsigned integer", the exclusive OR of the two is calculated, and this can be stored in the storage unit 106.

An embodiment of calculating an exclusive OR with a bit of another position, and not the least significant bit, can be adopted. However, it is preferable that the it is not the code bit.

The updating unit 107 updates by storing the results of the value calculated by he calculation unit 106 to the storage unit 104 (step S207), and returns to step S204.

The operation of bit harnessing may be another mode. For example, according to the above fixed-point notation, no matter what the value of $b_0$ to $b_{N-1}$ is, because the fixed-point that expresses the value is in the range of $-1$ to $1$, various bit calculations, etc., can be considered. For example, a calculation of below can be considered.

Cyclic shifting the bit sequence of the fixed-point notation, by the value sequentially extracted (0 or 1) from the numerical sequence.

Adding the value sequentially extracted (0 or 1) from the numerical sequence to a value looking at the bit sequence of the fixed-point notation as an "unsigned integer".

Subtracting the value sequentially extracted (0 or 1) from the numerical sequence, from a value looking at the bit sequence of the fixed-point notation as an "unsigned integer".

Exchanging the value of bit $b_p$ and bit $b_q$ concerning predetermined integers p and q, ($0 \leq p, q \leq N-1$), in a case where the values sequentially extracted from the numerical sequence is a pre-set value (for example, 1).

Concerning these calculations, it can be determined which calculation to adopt, considering the cycle of the sequence that can be obtained.

(Results of Experiment)

Figure 5:
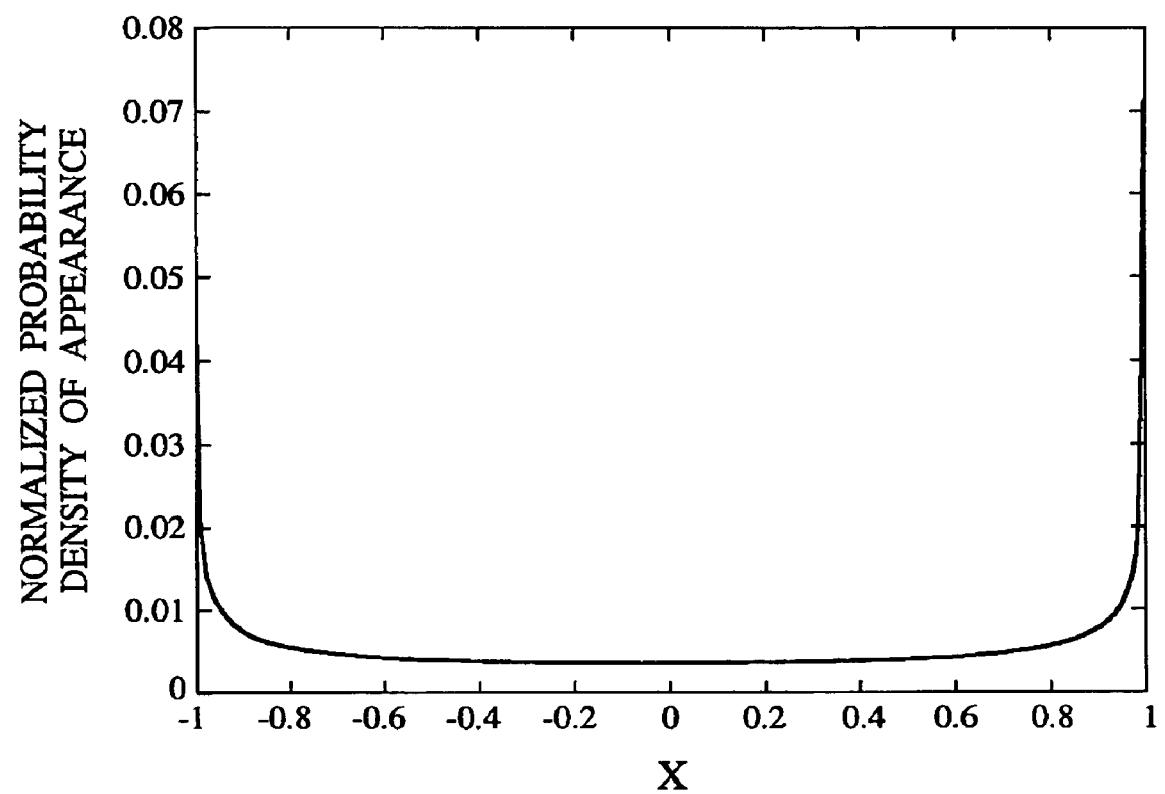
FIG. 5 is a graph showing a sequence distribution, in a case where a sequence is generated by a Chebyshev map at a rational number notation of an infinite precision.

FIG. 5 is a graph showing a sequence distribution, in a case where a sequence is generated by a Chebyshev map at a rational number notation of an infinite precision.

Figure 6:
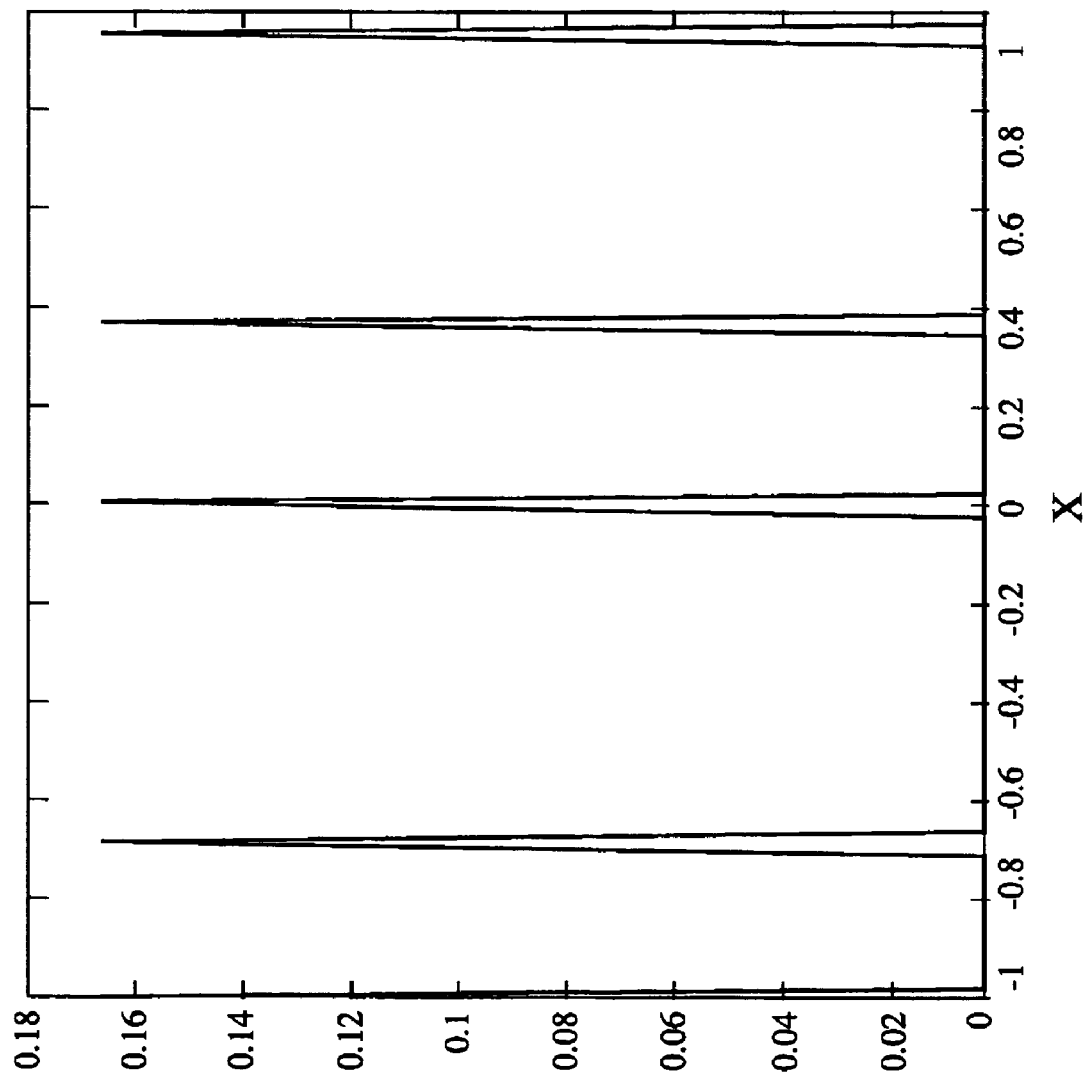
FIG. 6 is a graph showing a sequence distribution, in a case where bit harnessing is not carried out at an 8 bit precision.
Figure 7:
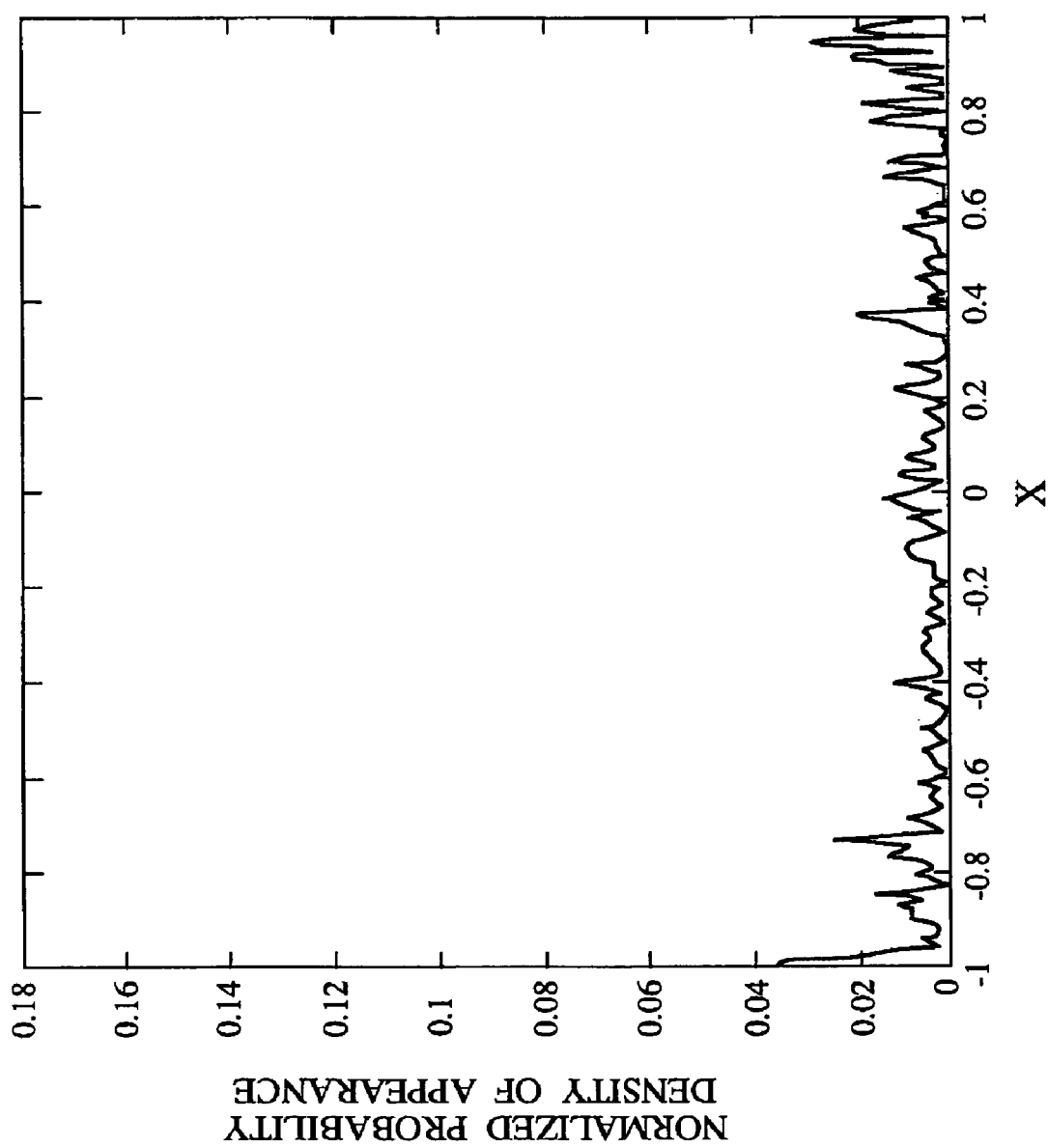
FIG. 7 is a graph showing a sequence distribution, in a case where the above embodiment is adopted at an 8 bit precision.
Figure 8:
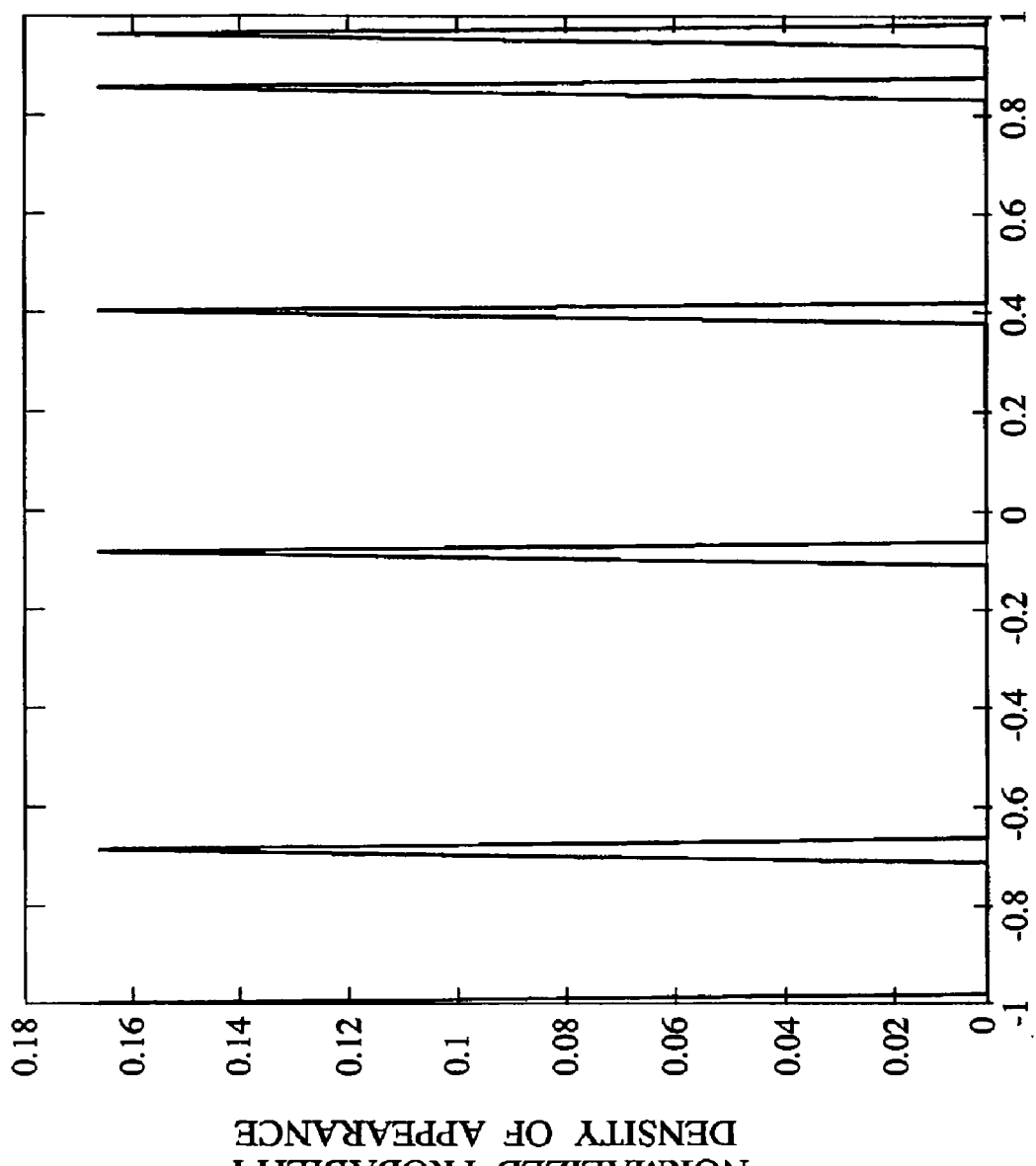
FIG. 8 is a graph showing a sequence distribution, in a case where bit harnessing is not carried out at a 12 bit precision.
Figure 9:
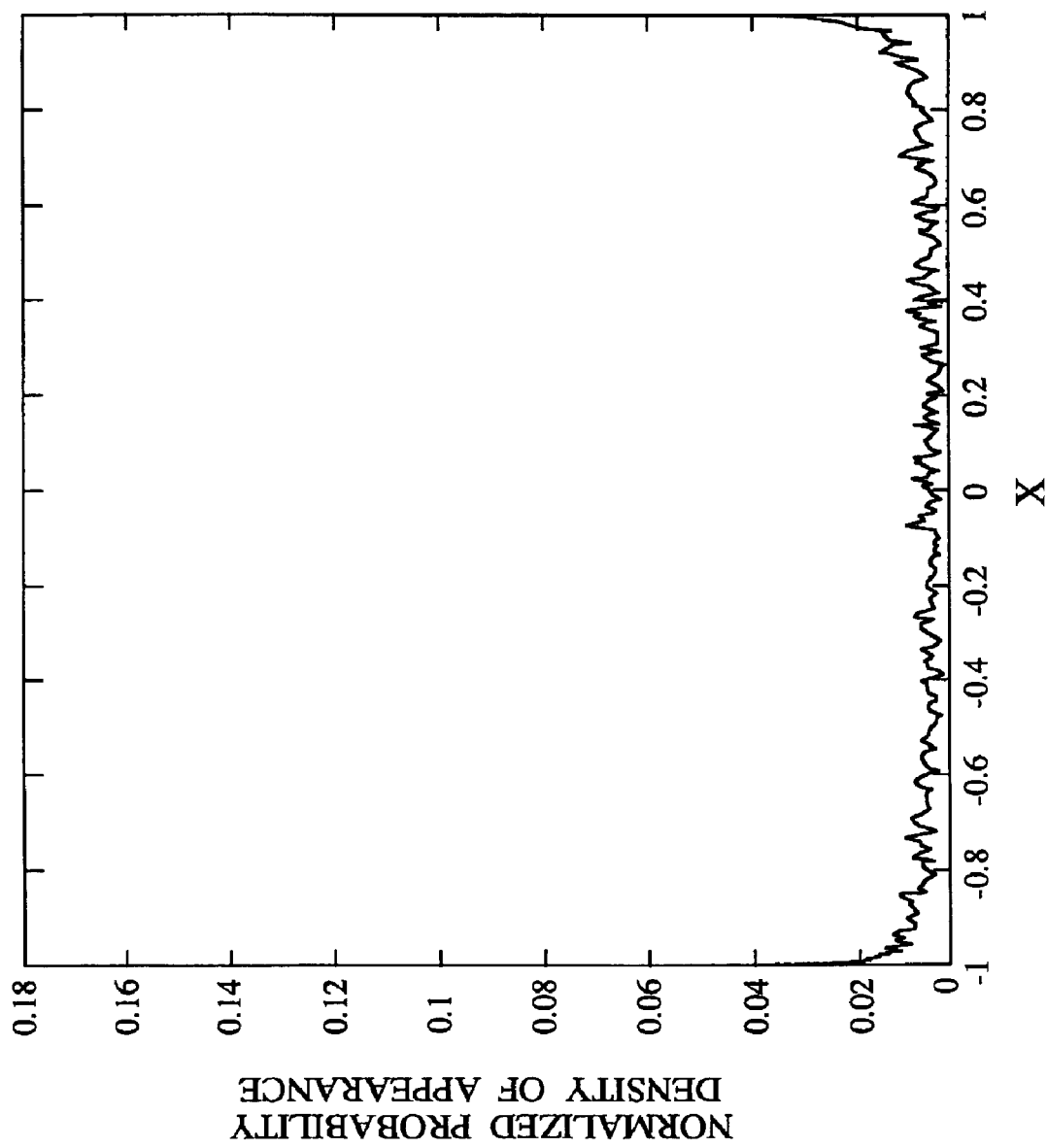
FIG. 9 is a graph showing a sequence distribution, in a case where the above embodiment is adopted at a 12 bit precision.
Figure 10:
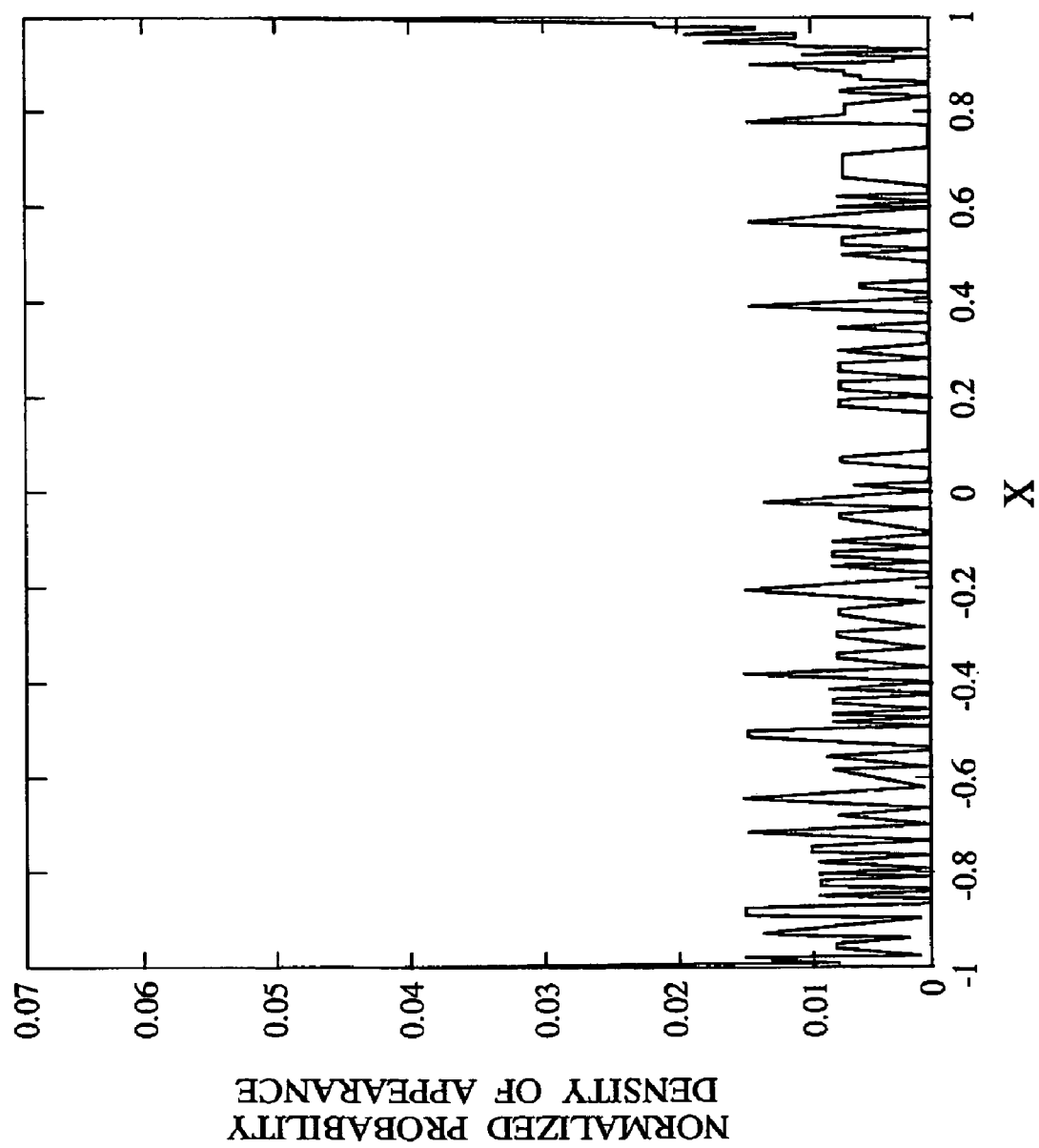
FIG. 10 is a graph showing a sequence distribution, in a case where bit harnessing is not carried out in a 16 bit precision.
Figure 11:
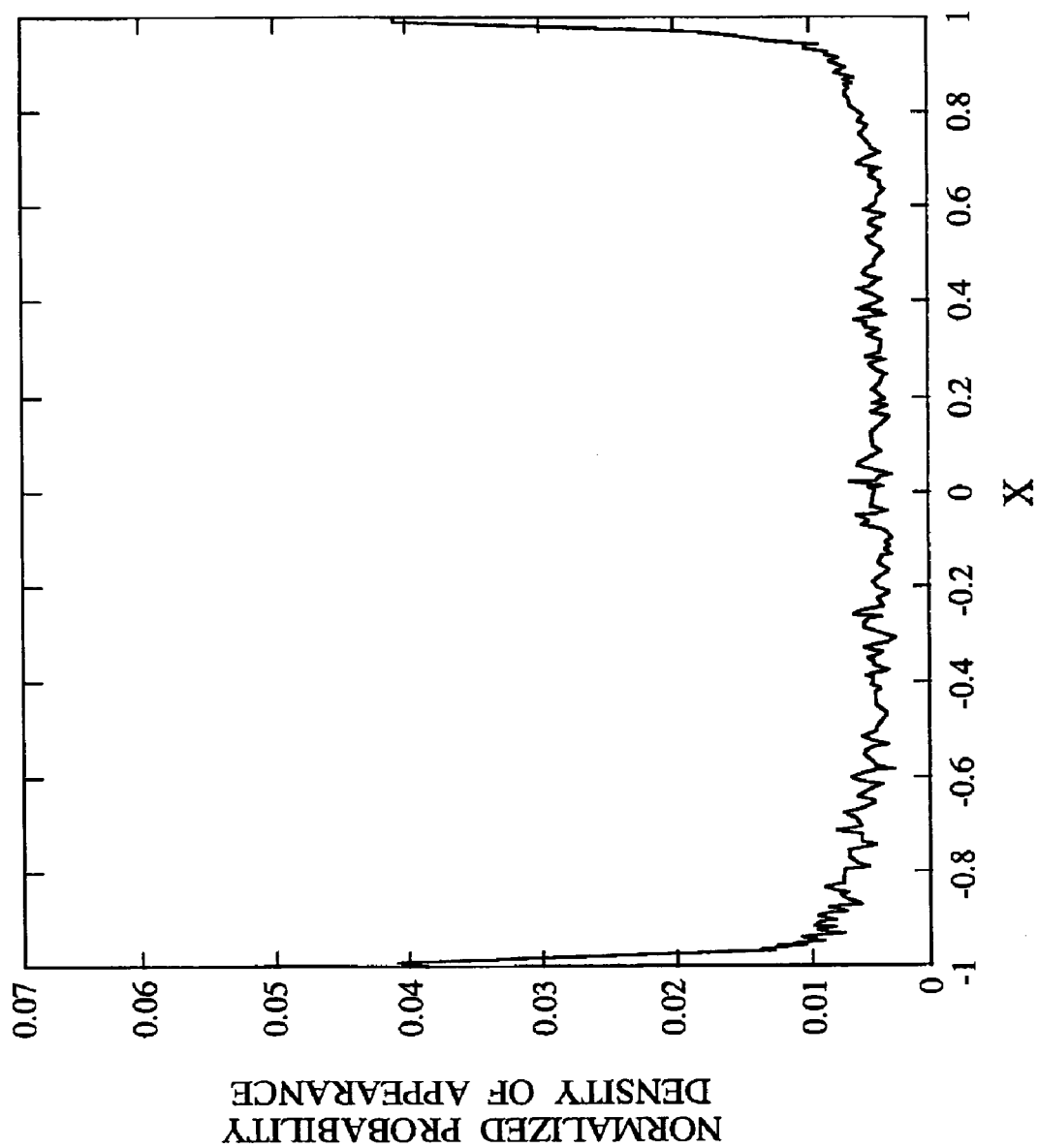
FIG. 11 is a graph showing a sequence distribution, in a case where the above embodiment is adopted at a 16 bit precision.

FIG. 6 is a graph showing a sequence distribution, in a case where a bit harnessing operation is not carried out at an 8 bit precision. FIG. 7 is a graph showing a sequence distribution, in a case where the above embodiment is adopted at an 8 bit precision. FIG. 8 is a graph showing a sequence distribution, in a case where a bit harnessing operation is not carried out at a 12 bit precision. FIG. 9 is a graph showing a sequence distribution, in a case where the above embodiment is adopted at a 12 bit precision. FIG. 10 is a graph showing a sequence distribution, in a case where a bit harnessing operation is not carried out in a 16 bit precision. FIG. 11 is a graph showing a sequence distribution, in a case where the above embodiment is adopted at a 16 bit precision.

Comparing these graphs, in the sequence distributions where a bit harnessing operation is not carried out, there is a large deviation, and there is a large difference compared to the sequence distributions where rational number notation of an infinite precision is adopted. However, using the method of the present embodiment, it can be seen that the sequence distributions where a bit harnessing operation is carried out is similar to sequence distributions where rational number notation of an infinite precision is adopted, and a good pseudo-random number is obtained.

Looking at the cycle of the output sequence, by carrying out a bit harnessing operation in the same way as the present embodiment, it can be seen that in most cases, the cycle becomes longer by several times or dozens of times. Therefore, a more preferable pseudorandom number sequence can be obtained.

Those skilled in the art can carry out the present invention by embodiments other than the preferred embodiment described in the description, which is illustrated and do not restrict the scope of the invention, and understands that the present invention is limited only by the scope of claims. Equivalents to the specific embodiment argued in the description can also carry out the present invention in the same way.

The patent application is based on Japanese Patent Application No. 2001-339429 filed with the Japan Patent Office on Nov. 5, 2001, the complete disclosure of which is hereby incorporated by reference.

INDUSTRIAL APPLICABILITY

As described above, according to the present invention, a random number sequence output apparatus, a random number sequence output method, a program for realizing the random number sequence output apparatus and the random number sequence output method, and a computer readable information recording medium that stores the program, can be provided.

The invention claimed is:

1. A random number sequence output apparatus comprising:

a storage unit which stores a predetermined number of bits representing a given value in a fixed-point format in a memory;

a sequence acceptance unit which accepts input of a numerical sequence;

an initial value setting unit which accepts input of an initial value, and gives the initial value to the storage unit;

an output unit which outputs the value each time a new value is given to the storage unit;

a calculation unit which applies a predetermined rational map to the value stored in the storage unit, and carries out a predetermined operation to the value stored in the storage unit and a value sequentially extracted from the numerical sequence accepted by the sequence acceptance unit, and an updating unit which updates by giving the results of the value calculated by the calculation unit to the storage unit;

wherein:

the predetermined operation inverts the bits of a predetermined position of a fixed-point format of the predetermined number of bits of the value stored in said storage unit, in a case where a value sequentially extracted from the numerical sequence is a predetermined value, and said predetermined rational map is a Chebyshev map $T(a, \theta)$ of an $a^{th}$ ($a \geq 2$) degree defined by $T(a, \cos \theta)$ towards an integer number a.

2. The random number sequence output apparatus according to claim 1, characterized by cyclic shifting of a bit sequence of a fixed-point format of a predetermined number of bits of the value stored in said storage unit, by the number of bits corresponding to predetermined value, instead of inverting the bits of a predetermined position of a fixed-point format of the predetermined number of bits of the value, in said predetermined operation.

3. The random number sequence output apparatus according to claim 2, characterized by exchanging the bits of two predetermined positions of the bit sequence of a fixed-point format of a predetermined number of bits of the value stored in said storage unit, instead of inverting the bits of a predetermined position of a fixed-point format of the predetermined number of bits of the value, in said predetermined operation.

4. The random number sequence output apparatus according to claim 1, characterized by adding or subtracting the predetermined value to the bit sequence of a fixed-point format of a predetermined number of bits of the value stored in said storage unit, looking at the sequence as an unsigned integer, instead of inverting the bits of a predetermined position of a fixed-point format of the predetermined number of bits of the value, in said predetermined operation.

5. The random number sequence output apparatus according to any one of claims 1 to 3, characterized in that:

the numerical sequence has a length T that repeats a binary sequence, including a gold code, an M sequence, or a Baker sequence, taking a value of 0 or 1, and the bit of the predetermined position is a least significant bit of the fixed-point format, and the predetermined value is 1.

6. A random number sequence output method using a storage unit that stores a predetermined number of bits representing a given value in a fixed-point format in a memory, comprising:

a sequence acceptance step in which input of a numerical sequence is accepted;

an initial value setting step in which input of an initial value is accepted, and the value is given to said storage unit;

an output step in which the value is output each time a new value is given to said storage unit;

a calculation step in which a predetermined rational map is applied to the value stored in the storage unit, and a predetermined operation is carried out to the value of above and a value sequentially extracted from the numerical sequence accepted in the sequence acceptance step, and an updating step updates by giving the results of the value calculated in the calculation step, to said storage unit;

wherein:

the predetermined operation inverts the bits of a predetermined position of a fixed-point format of the predetermined number of bits of the value stored in said storage unit, in a case where a value sequentially extracted from the numerical sequence is a predetermined value, and said rational map is a Chebyshev map $T(a,\theta)$ of an $a^{th}$ ($a \geq 2$) degree defined by $T(a, \cos \theta) = \cos(a\theta)$ towards an integer number a.

7. The random number sequence output method according to claim 6, characterized by cyclic shifting of bit sequence of a fixed-point format of a predetermined number of bits of the value stored in said storage unit, by the number of bits corresponding to the predetermined value, instead of inverting the bits of a predetermined position of a fixed-point format of the predetermined number of bits of the value, in said predetermined operation.

8. The random number sequence output method according to claim 6, characterized by adding or subtracting the predetermined value to the bit sequence of a fixed-point format of a predetermined number of bits of the value stored in said storage unit is added or subtracted, looking at the sequence as an unsigned integer, instead of inverting the bits of a predetermined position of a fixed-point format of the predetermined number of bits of the value, in said predetermined operation.

9. The random number sequence output method according to claim 6, characterized by exchanging the bits of two predetermined positions of the bit sequence of a fixed-point format of a predetermined number of bits of the value stored in said storage unit, instead of inverting bits of a predetermined position of a fixed-point format of the predetermined number of bits of the value, in said predetermined operation.

10. The random number sequence output method according to any one of claims 6 to 9, characterized in that:

the numerical sequence is a length T, and is a sequence that repeats a binary sequence, including a gold code, an M sequence, or a Baker sequence, taking a value of 0 or 1;

a bit of the predetermined position is a least significant bit of the fixed-point format, and the predetermined value is 1.

11. A program product that controls a computer to function as;

a storage unit which stores a predetermined number of bits representing a given value in a fixed-point format in a memory;

a sequence acceptance unit which accepts input of a numeral sequence;

an initial value setting unit which accepts input of an initial value, and gives the initial value to the storage unit;

a calculation unit which a predetermined rational map to the value stored in the storage unit, and carries out a predetermined operation to the value stored in the storage unit and a value sequentially extracted from the numerical sequence accepted by the sequence acceptance unit; and an updating unit which updates by giving the results of the value calculated by the calculation unit to the storage unit;

wherein:

the predetermined operation inverts the bits of a predetermined position of a fixed-point format of the predetermined number of bits of the value stored in said storage unit, in a case where a value sequentially extracted from the numerical sequence is a predetermined value, and said predetermined rational map is a Chebyshev map $T(a, \theta)$ of a $a^{th}$ (a>2) degree defined by $T(a,\cos\theta)=\cos(a\theta)$ towards an integer number a.

12. A computer readable information recording medium, which is any of a compact disk, a flexible disk, a hard disk, a magnetic optical disk, a digital video disk, a magnetic tape, or a semiconductor memory, recording a program which controls a computer to function as:

a storage unit which stores a predetermined number of bits representing a given value in a fixed-point format in a memory;

a sequence acceptance unit which accepts input of a numeral sequence;

an initial value setting unit which accepts input of an initial value, and gives the initial value to the storage unit;

an output unit which outputs the value each time a new value is given to the storage unit;

a calculation unit which applies a predetermined rational map to the value stored in the storage unit, and carries out a predetermined operation to the value of above and a value sequentially extracted from the numerical sequence accepted by the sequence acceptance unit, and an updating unit which updates by giving the results of the value calculated by the calculation unit to the storage unit;

wherein the predetermined operation inverts the bits of a predetermined position of a fixed-point format of the predetermined number of bits of the value stored in said storage unit, in a case where a value sequentially extracted from the numerical sequences is a predetermined value, and said predetermined rational map is a Chebyshev map $T(a, \theta)$ of an $a^{th}$ (a≧2) degree defined by $T(a,\cos\theta)=\cos(a\theta)$ towards an integer number a.

13. The computer readable information recording medium according to claim 12, characterized by a cyclic shifting a bit sequence of a fixed-point format of a predetermined number of bits of the value stored in said storage unit, by the number of bits corresponding to predetermined value, instead of inverting the bits of a predetermined position of a fixed-point format of the predetermined number of bits of the value, in said predetermined operation.

14. The computer readable information recording medium according to claim 12, characterized by adding or subtracting the predetermined value to the bit sequence of a fixed-point format of a predetermined number of bits of the value stored in said storage unit, looking at the sequence as an unsigned integer, instead of inverting the bits of a predetermined position of a fixed-point format of the predetermined number of bits of the value, in said predetermined operation.

15. The computer readable information recording medium according to claim 12, characterized by exchanging the bits of two predetermined positions of the bit sequence of a fixed-point format of the predetermined number of bits of the value stored in said storage unit, instead of inverting the bits of a predetermined position of a fixed-point format of the predetermined number of bits of the value, in said predetermined operation.

16. The computer readable information recording medium according to any one of claims 12 to 15, wherein:

the numerical sequence has a length T that repeats a binary sequence, including a gold code, an M sequence, or a Baker sequence, taking a value of 0 or 1, the bit of the predetermined position is a least significant bit of the fixed-point format, and the predetermined value is 1.

* * * * *